2,914,493

CELLULOSE SPONGE COMPOSITION CONTAINING POLYETHYLENE TEREPHTHALATE FIBER AND METHOD OF MAKING

Paul Koot, Ede, Netherlands, assignor to American Enka Corporation, Enka, N.C., a corporation of Delaware No Drawing. Application February 4, 1957
Serial No. 637,889

Claims priority, application Netherlands February 24, 1956

5 Claims. (Cl. 260—2.5)

This invention relates to the manufacture of artificial sponges made from cellulose. More particularly, this invention relates to the manufacture of reinforced cellulose sponges from viscose.

It is well known to manufacture cellulose sponges by mixing viscose (an alkaline solution of alkali cellulose xanthogenate) with a pore-forming material, together with some reinforcing fibrous material.

As pore-forming materials, salt crystals such as sodium sulfate decahydrate, commonly referred to as Glauber's salt, have been used. Fibers such as jute, hackled flax or hemp, rayon and cotton have heretofore been employed as the fibrous reinforcing material in sponges.

Viscose, together with the pore-forming substance and the reinforcing fibers are formed into a paste. The paste is then usually introduced into molds where the coagulation and decomposition are accomplished in a way well known to those skilled in the art. The decomposed shaped articles obtained are then separated from the salt and other impurities by washing, after which they are cut to the desired dimensions and dried.

The artificial sponges obtained according to the known methods have been found to possess certain undesirable features. When using the known reinforcing fibrous material, the strength, especially wet strength, resistance to wear, resiliency and form stability of the sponges so manufactured leave much to be desired.

An object of this invention is to provide a new and improved process for manufacturing artificial sponges from viscose.

Another object of this invention is to provide a new and improved sponge-forming composition.

Still another object of this invention is to provide a new and improved artificial cellulose sponge.

Other and additional objects will become apparent hereinafter.

In accordance with the present invention, the objects of this invention are accomplished, in general, by incorporating reinforcing fibers which in part are composed of polyester staple fibers into a cellulose sponge-forming material and decomposing the mixture to obtain a cellulose sponge. It is preferred that polyester fibers compose about 5–30% of the reinforcing fibers. The reinforcing fiber other than the polyester fiber may consist of material ordinarily used for such purposes, such as jute, hemp, flax, cotton, rayon, etc.

By incorporating reinforcing fibers containing the above mentioned polyester fiber, there is a notable improvement in the resulting sponge physical properties, especially in the wet strength, resistance to wear, resiliency and form stability. This is indeed surprising in view of the fact that on adding polyamide fibers of the nylon type in like manner the sponges so manufactured do not show any notable improvement in the above properties. Furthermore, the polyester fibers show an unexpected good adhesion to the sponge material.

The polyester fibers as herein referred to are the synthetic polyesters obtained by the condensation of one or more diols of the series $HO(CH_2)_nOH$, wherein $n$ is a whole number of from 2 to 10, inclusive, with terephthalic acid or one of its ester forming derivatives. The commercially available polyethylene terephthalate is the preferred fiber.

The preferred pore-forming material is sodium sulfate decahydrate. However, other substances which melt or dissolve easily have been used as a pore-forming material in the manufacturing of cellulose sponge and accordingly may be used in the present invention. The pore-forming substance may be selected as to size and shape so as to produce a texture very similar to natural sponges. Ordinarily the sodium sulfate decahydrate crystals are present in the sponge-forming material in an amount about 50–90% by weight thereof, although the amount may vary considerably.

A very strong sponge having greatly improved wear resistance without at the same time losing its water absorption qualities is produced when about 5–30% of the reinforcing fiber consists of polyester fibers. When less than 5% by weight of the fibers in the artificial sponge consist of polyester fibers, the artificial sponge shows little improvement in resiliency and resistance over known sponges. On the other hand, when more than 30% by weight of the fibers in the artificial sponge consist of polyester fibers, the desired sponge properties are not proportionally enhanced. The total fiber content may amount to 0.5–3.0% of the total sponge forming mixture. Larger contents of reinforcing fibers tend to make a stronger sponge at the expense of absorbent ability. Below 0.5% fiber content the strength of the sponge decreases.

In a preferred embodiment the artificial sponges of the present invention are reinforced with polyester staple fibers which have been crimped or curled in a manner well known in the art. This imparts to the sponge an even greater resiliency. Also, to further improve the adhesion of the polyester staple fibers to the sponge body, the fiber may have a rough surface.

The invention will be further illustrated by the following specific example. It is understood that this example is merely illustrative of the invention and that the scope of the invention is not limited thereto.

*Example*

4.05 kg. of commercially obtainable flax fibers cut into staple lengths of about 2 cm. was randomly commingled with 0.45 kg. of polyethylene terephthalate fibers having a filament denier of 3 and a staple length of about 4 cm. The commingled fibers were then blown into a viscose-salt mixture with the aid of compressed air, while stirring vigorously. This viscose-salt mixture was obtained by mixing 134 kg. of viscose having a cellulose content of 9.2% with 700 kg. of granulated sodium sulfate decahydrate. The fibers in the resutling sponge-forming composition were uniformly dispersed and distributed throughout the mass.

The sponge-forming composition was brought into molds and subjected to a coagulating treatment in the conventional manner. Thereafter the sponge material was removed from the molds, subjected to the usual finishing treatments, cut to a desired size and finally dried.

The sponges so obtained had a very high strength and high resistance to wear. The adhesion of the polyester fibers to the cellulose sponge was satisfactory.

Additional sponges were manufactured in the same manner as above except that 4.50 kg. of the flax fiber with no polyester fiber, were mixed with the viscose-salt mixture. In this case the strength and resistance to wear of the sponges were lower.

For example, when the sponges were compared it was found that the sponges containing the polyester fibers, when compressed and released, regained its original size 20% quicker than the sponges containing no polyester fiber which were subjected to the same conditions. Also, the strength of the sponges containing the polyester fibers was measured to be 1.7 kg./cm.$^2$ as compared to a strength of 1.5 kg./cm.$^2$ for the sponges not containing polyester fibers. When the two sponges were subjected to wear resistance tests, it was found that the wear resistance of the sponges containing polyester fibers were about twice as good as sponges not containing the polyester fiber.

Both types of sponges were used for ten days under identical conditions after which they were examined. It was found that the sponges reinforced with polyester fiber had a better appearance than the other sponges. The edges were much smoother and the original shape had been retained to a better degree. The wear was also less noticeable. Furthermore, upon wetting, pressing out the liquid and releasing, the sponges reinforced with polyester fibers more quickly returned to their original shape.

What is claimed is:

1. Sponge-forming composition containing viscose and, 0.5–3.0% by weight of reinforcing staple fibers composed of 5–30% by weight of polyethylene terephthalate staple fibers and the remainder selected from the group consisting of jute, hemp, flax, rayon and cotton.

2. Sponge-forming composition comprising viscose, 0.5–3.0% by weight of reinforcing staple fibers composed of 5–30% by weight of polyethylene terephthalate staple fibers and the remainder selected from the group consisting of jute, hemp, flax, rayon and cotton, and granules of a pore-forming material, said pore-forming material being sodium sulfate decahydrate.

3. An artificial cellulose sponge containing 0.5–3.0% by weight of reinforcing staple fibers composed of 5–30% by weight of polyethylene terephthalate staple fibers and the remainder selected from the group consisting of jute, hemp, flax, rayon and cotton.

4. In a process for the manufacture of artificial cellulose sponges, the improvement comprising commingling a staple fiber of polyethylene terephthalate with sponge reinforcing staple fibers selected from the group consisting of jute, hemp, flax, rayon and cotton, said polyethylene terephthalate comprising 5–30% of the total fiber content and mixing the commingled fibers with viscose.

5. The process as defined by claim 4 where the polyethylene terephthalate is crimped.

References Cited in the file of this patent

UNITED STATES PATENTS

| | | |
|---|---|---|
| 2,341,509 | Bley | Feb. 15, 1944 |
| 2,464,772 | Drisch | Mar. 15, 1949 |
| 2,556,295 | Pace | June 12, 1951 |